United States Patent
Tanner (12)

(10) Patent No.: US 10,364,583 B2
(45) Date of Patent: Jul. 30, 2019

(54) DEPLOYABLE SELF-SUSTAINING SHELTER

(71) Applicant: Nathan Tanner, Georgetown, KY (US)

(72) Inventor: Nathan Tanner, Georgetown, KY (US)

( * ) Notice: Subject to any disclaimer, the term of this patent is extended or adjusted under 35 U.S.C. 154(b) by 50 days.

(21) Appl. No.: 15/404,528

(22) Filed: Jan. 12, 2017

(65) Prior Publication Data

US 2017/0198485 A1    Jul. 13, 2017

Related U.S. Application Data (60) Provisional application No. 62/277,926, filed on Jan. 12, 2016.

(51) Int. Cl.
| | |
|---|---|
| *E04H 1/12* | (2006.01) |
| *F24F 13/02* | (2006.01) |
| *E04H 9/16* | (2006.01) |
| *E04B 1/343* | (2006.01) |
| *H02G 3/36* | (2006.01) |
| *H01R 39/28* | (2006.01) |
| *H01R 39/64* | (2006.01) |

(52) U.S. Cl.
CPC .............. *E04H 1/12* (2013.01); *E04H 9/16* (2013.01); *F24F 13/02* (2013.01); *F24F 13/0209* (2013.01); *F24F 13/0236* (2013.01); *E04B 1/34305* (2013.01); *F24F 2221/12* (2013.01); *H01R 39/28* (2013.01); *H01R 39/643* (2013.01); *H02G 3/36* (2013.01)

(58) Field of Classification Search
CPC .......... E04H 1/12; E04H 9/16; F24F 13/0236; F24F 13/02; F24F 13/0209; F24F 2221/12; E04B 1/34305; G06F 1/183; G06F 1/184; G06F 1/185; H02G 3/36; H02R 39/28; H02R 39/643
USPC .................................................. 361/727, 756
See application file for complete search history.

(56) References Cited

U.S. PATENT DOCUMENTS

| | | |
|---|---|---|
| 3,831,581 A | 8/1974 | Baseley |
| 3,833,954 A | 9/1974 | Daughenbaugh et al. |
| 3,966,285 A | 6/1976 | Porch et al. |
| 4,235,346 A | 11/1980 | Liggett |
| 4,603,518 A | 8/1986 | Fennes |
| 4,689,924 A | 9/1987 | Jurgensen |
| 4,854,094 A | 8/1989 | Clark |
| 5,060,426 A | 10/1991 | Jantzen |
| 5,061,001 A | 10/1991 | Madden et al. |

(Continued)

FOREIGN PATENT DOCUMENTS

WO    WO-2010015062 A1 *   2/2010   ............... B60P 3/34

*Primary Examiner* — Adriana Figueroa
(74) *Attorney, Agent, or Firm* — King & Schickli, PLLC (57) ABSTRACT

An expandable, mobile structure is capable of sustaining a retracted state and an expanded state, and may be capable of alternately using public utilities as a power supply, or a self-contained "off-grid" power supply. This allows for use of the mobile structure in a multitude of locations, which are not governed by the presence or absence of an available external power supply. The structure may operate in an "on-grid" power mode when in an expanded condition, and in an "off-grid" mode in a retracted condition. The structure includes a different number of zones within the structure in the retracted state as compared to the expanded state. A modular HVAC system provides a different flow path of air in the retracted state and the expanded state.

13 Claims, 12 Drawing Sheets

(56) References Cited

U.S. PATENT DOCUMENTS

| | | |
|---|---|---|
| 5,237,784 A | 8/1993 | Ros |
| 5,285,604 A | 2/1994 | Carlin |
| 5,449,112 A * | 9/1995 | Heitman ............... F24F 11/0001 236/49.3 |
| 5,586,802 A | 12/1996 | Dewald, Jr. et al. |
| 5,658,032 A * | 8/1997 | Gardner .................... B60P 3/34 296/175 |
| 5,815,988 A | 10/1998 | Molina |
| 5,916,096 A * | 6/1999 | Wiesmann ............ E04H 15/008 135/139 |
| 5,966,956 A | 10/1999 | Morris et al. |
| 6,243,993 B1 | 6/2001 | Swensson |
| 6,669,552 B1 * | 12/2003 | Beer ........................ E21F 1/04 454/171 |
| 6,905,154 B1 | 6/2005 | Buls et al. |
| 7,117,645 B2 | 10/2006 | Bzorgi |
| 7,418,802 B2 | 9/2008 | Sarine et al. |
| 8,136,306 B2 | 3/2012 | Scheps |
| 8,291,647 B2 | 10/2012 | Esposito |
| 8,291,648 B1 * | 10/2012 | Orr ..................... E04B 1/34305 52/86 |
| 8,650,806 B1 | 2/2014 | Condie |
| 8,695,285 B2 | 4/2014 | Reinmann, Jr. et al. |
| 8,720,125 B2 * | 5/2014 | Andretich ............... H02S 20/00 52/79.5 |
| 8,959,843 B2 * | 2/2015 | Trout .................. E04B 1/34305 52/67 |
| 8,973,335 B2 | 3/2015 | Wilson |
| 9,016,001 B2 | 4/2015 | Heger |
| 9,121,617 B2 * | 9/2015 | Condie .................... F24F 1/02 |
| 9,458,621 B2 * | 10/2016 | Calafatis ............ E04B 1/34305 |
| 2004/0262948 A1 | 12/2004 | Parmer |
| 2006/0070307 A1 | 4/2006 | Lambright |
| 2006/0254160 A1 | 11/2006 | Lee |
| 2008/0318514 A1 * | 12/2008 | Fettkether .......... F24F 13/0218 454/330 |
| 2013/0305627 A1 * | 11/2013 | Pike .................... E04B 1/34305 52/79.5 |

* cited by examiner

DEPLOYABLE SELF-SUSTAINING SHELTER

This application claims priority to U.S. Provisional Patent Application Ser. No. 62/277,926, filed Jan. 12, 2016, the disclosure of which is incorporated herein by reference.

TECHNICAL FIELD

The invention relates to an expandable structure, and in particular to an expandable structure which may include alternate electrical flow paths or alternate conditioned air flow paths in an expanded and a retracted condition.

BACKGROUND OF THE INVENTION

Mobile structures may be useful for providing shelter in a plurality of disparate locations, such as in various environments, with the ability to move between said locations and function therein. Expandable mobile structures offer the ability to reduce the size of the mobile structure in certain configurations, such as for travel between locations.

In locations in which utilities such as power and water are available, it is advantageous for the mobile structure to be adapted to connect to such utilities as needed. It is also advantageous for a mobile structure to be self-sufficient and to have the ability to operate in the absence of such utilities. However, devices which allow for self-sufficient operation in the absence of available utilities, at least in terms of power usage and environmental modification such as air conditioning or heating, tend to be limited in their operational ability as compared to those which freely use public utilities. For example, while solar panels may allow for generation of power for electricity, their ability to supply said electricity for use by a structure are limited by the amount of sunlight available, as well as the quantity of power that may be stored when compared to the convenience of being connected to a public utility power supply, which essentially offers unlimited power. This generally results in a mobile structure connected to public utilities having the ability to use a greater amount of resources than one which is operating in the absence of public utilities.

The unique device described herein provides an expandable mobile structure capable of operating in both the presence of public utilities (i.e. "on-grid") as well as in the absence of such utilities (i.e. "off-grid"), while functionally interconnecting the manipulation of structure itself, such as changes in the size of the structure itself, to the switching between on-grid and off-grid functionality. By doing so, a mobile structure is provided which may take a first configuration, such as an expanded configuration, and may operate in an on-grid mode, thereby taking advantage of available utilities, which may essentially be unlimited, and may also take on a second configuration, such as a retracted configuration, which may operate in an off-grid mode. In a retracted configuration, the structure includes less interior space, thereby requiring the consuming less resources, such as for environmental modification, when such resources may be limited by the nature of off-grid technology.

SUMMARY OF THE INVENTION

The present invention relates to a structure comprising an expandable structural frame adapted expand to an expanded condition and retract to a retracted condition, wherein the expandable structural frame comprises a first frame member and a second frame member, said first and second frame members telescopically connected to one another for expansion and retraction of the structure, a first electrical flow path adapted for providing electrical power to the structure in the expanded condition, and a second electrical flow path adapted for providing electrical power to the structure in the retracted condition, said second electrical flow path different from the first electrical flow path.

In one aspect, the structure may further include an electrically conductive switching device, such as a caster carriage dongle, in a fixed position with respect to the first frame member and adapted to maintain moving contact with the second frame member during expansion and retraction of the structure. The second frame member may include a track for receiving the caster carriage dongle. The caster carriage dongle may include at least one roller adapted for rolling along the second frame member during expansion and retraction of the structure. Electrical contact between the caster carriage dongle and the second frame member may close a first circuit, thereby allowing electricity to flow along the first electrical flow path. In the retracted condition, the caster carriage dongle may be positioned so as not to be in electrical contact with the second frame member, thereby opening the first circuit. The expandable structural frame may further include a power transfer box adapted to contact the caster carriage dongle in the retracted condition, thereby closing a second circuit and thereby allowing electricity to flow along the second electrical flow path.

In another aspect, the first electrical flow path may be adapted to utilize power from an on-grid power source, and wherein the second electrical flow path is adapted to utilize power from an off-grid power source.

Means may be provided for expanding the expandable structural frame between the retracted and expanded conditions. This means for expanding the frame may include a motor, an actuator, a pneumatic cylinder, a gear system, a pulley system, or any other means capable of moving the first frame member and the second frame member with respect to each other. In one embodiment, the means for expanding the frame may include a worm gear system, such as a worm gear screw actuator, a low-geared helical motor, and modified worm gear sleeve.

In another embodiment, the present invention relates to an expandable structure for use with an air conditioning unit for conditioning air within the expandable structure. The expandable structure may include an expandable HVAC system including primary ductwork, secondary ductwork, and tertiary ductwork, wherein the primary ductwork, secondary ductwork, and tertiary ductwork are adapted to together define an expanded configuration and a retracted configuration, and wherein the expandable HVAC system defines a first fluid pathway in the expanded configuration and a second fluid pathway in the retracted conditions, said second fluid pathway being different from the first fluid pathway.

In one aspect, the primary ductwork, the secondary ductwork, and the tertiary ductwork may be in direct serial fluid communication with one another in both the expanded configuration and in the retracted configuration.

In another aspect, the expandable structure may include an expandable structural frame adapted to expand to an expanded condition and to retract to a retracted condition, wherein in the expanded condition, the expandable structural frame defines a first zone, a second zone, and a third zone, and wherein in the retracted condition, the expandable structural frame defines only the first zone and the third zone. In the expanded condition, the primary ductwork may be in direct fluid communication with the first zone, the secondary ductwork may be in direct fluid communication with the second zone, and the tertiary ductwork may be in direct fluid communication with the third zone, while in the retracted condition, the secondary ductwork may not be in direct fluid communication with the first, second, or third zones.

The first fluid pathway may be adapted to deliver conditioned air through the primary ductwork, the secondary ductwork, and the tertiary ductwork to the first zone, the second zone, and the third zone, while the second fluid pathway may be adapted to deliver conditioned air through the primary ductwork, the secondary ductwork, and the tertiary ductwork to the first zone and the third zone only. The secondary ductwork may include at least one register, said register adapted to receive conditioned air from the primary ductwork in the retracted condition and said register further adapted to deliver conditioned air to the second zone in the expanded condition.

The use of a single expandable HVAC ductwork system which may modify the environment within the expandable structure in an expanded state, as well as within the expandable structure in a retracted state, allows for dual environmental regulation functionality of a single system utilizing different amounts of resources in each state. The invention further relates to a single structure which includes both the on-grid to off-grid electrical switching capabilities described herein and the expandable HVAC ductwork system described herein. This combination allows for the a single ductwork system to aid in the regulation of a smaller internal space, such as in the retracted condition, when the expandable structure is operating off-grid, thereby requiring less power, and also to aid in the regulation of a larger internal space, such as in the expanded condition, when the expandable structure is operating on-grid, when more power is available for operating the HVAC system.

DETAILED DESCRIPTION OF THE INVENTION

Common reference numeral are used throughout the drawings and detailed description to indicate like elements; therefore, reference numerals used in a drawing may or may not be referenced in the detailed description specific to such drawing if the associated element is described elsewhere.

Embodiments of a two-part shell structural frame and sub-frame system and integral carbon fiber sub-frame HVAC ductwork system in accordance with the present invention can allow for a more efficient, adaptable culmination of structural and mechanical systems. The ability to expand and retract mechanical system affords the possibility of expansion, and exposure or retraction and safety, despite the intended structural use, while maintaining a constant, controlled and climatized environment regardless of the inventions operating position or location.

Figure 1:
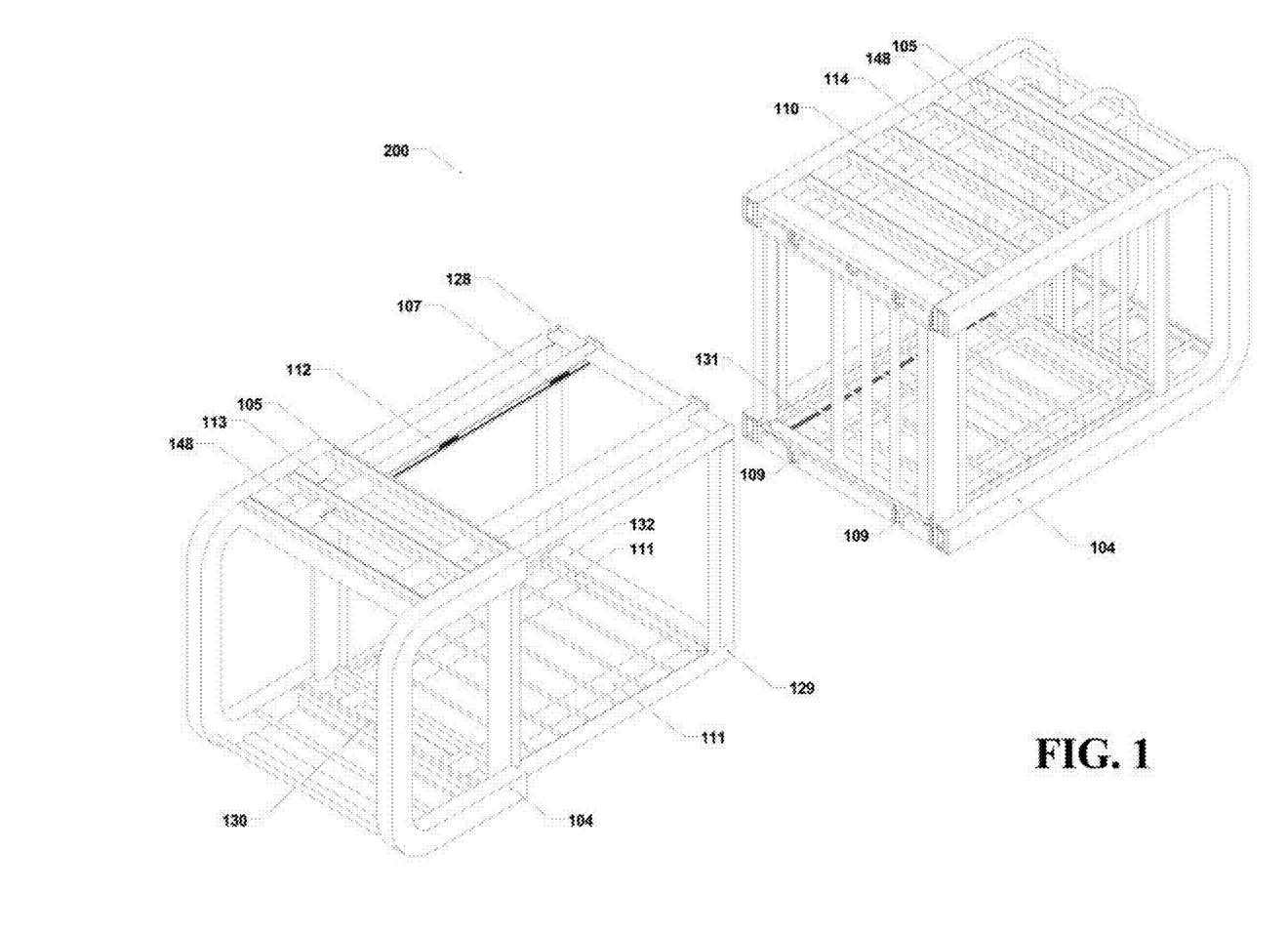
FIG. 1 is a top-down perspective view of an embodiment of a two-part shell structural system of the present invention in a separated condition.

Referring to FIG. 1, an embodiment of the two-part shell structural frame and sub-frame system, hereinafter alternately referred to as the shell structural system 200, in accordance with the present invention is shown in a separated configuration. Each half of the two-part shell may include exterior structural frame members 104 which may be interconnected by one or more secondary structural frame members, also referred to as a sub-frame member. These secondary structural frame members may include upper secondary structural frame members 105 and lower secondary structural frame member 148. These upper and lower secondary structural frame members 105, 148 can be arranged and organized in any manner necessary to adapt to any change of scale or concept and form structural frame plenums 113 and 114 which house the integral carbon fiber ductwork 108. These structural frame and sub-frame members may be fabricated from steel, aluminum or carbon fiber and may comprise any interchangeable combination of respective elements, depending on intent of use, climate/corrosion factors and other variable scenarios which may call for varying adaptability.

The two-part shell structural frame and sub-frame system may be interconnected by an upper nested structural sub-frame system 128 and a lower nested structural sub-frame system 129. The upper nested structural sub-frame system 128 may include a sub-frame ductwork system 107, which in one embodiment may be an integral carbon fiber ductwork system. This sub-frame ductwork system allows for consistent passage of air-flow in both expanded and retracted states. In one aspect, the upper nested structural sub-frame system 128 may include integrated upper sub-frame rail 112 and upper sub-frame rail guide 110. Similarly, the lower nested structural sub-frame system 129 may include lower sub-frame rail 111 and lower sub-frame rail guide 109. The upper and lower nested structural sub-frame systems 128, 129 may allow for interconnection of the two parts of the shell structural system 200 and provide the guidance mechanism and structural basis-of-design which enables the expansion and retraction of the shell structural system.

In one aspect, the lower nested structural sub-frame 129 and may include casters 130, which may be heavy duty solid rubber casters. These casters 130 may extend between the lower sub-frame rails 111.

In addition, the shell structural system 200 may be provided with a means for expanding the frame from a retracted to an expanded state. For example, the expanding means may include a motor, an actuator, a pneumatic cylinder, a gear system, a pulley system, or any other means capable of moving the two parts of the structural frame and sub-frame with respect to each other. In the illustrated embodiment, the means for expanding the frame includes a worm gear screw actuator 131 and a low-geared helical motor and modified worm gear sleeve 132. The lower nested structural sub-frame 129, in conjunction with the fixed worm gear screw actuator 131 and low-geared helical motor and modified worm gear sleeve 132, enables the expansion and retraction of the system along the lower sub-frame rail guide 109 via the expansion drive mechanism.

Figure 2A:
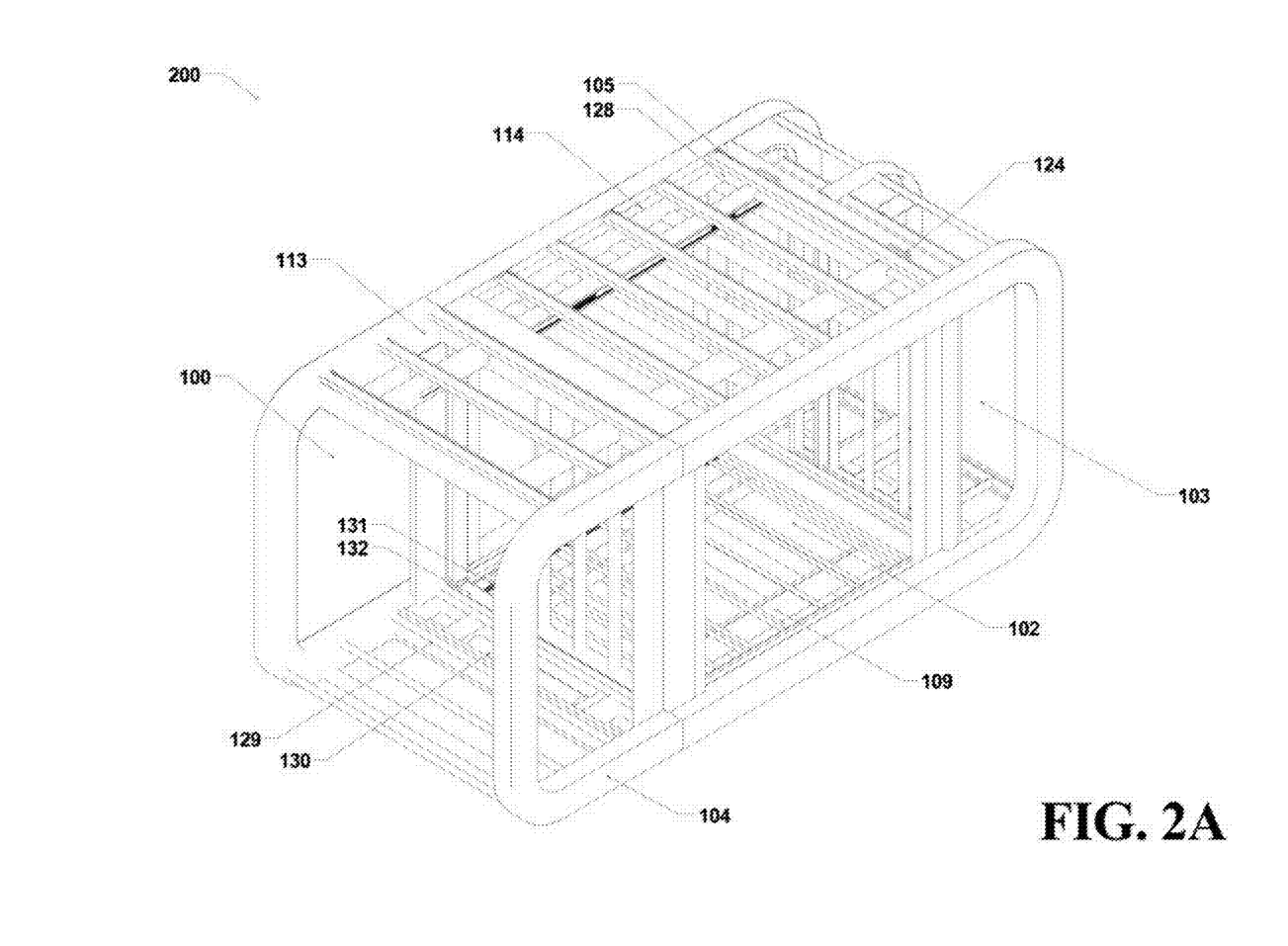
FIG. 2A is a top-down perspective view of the two-part shell structural system of FIG. 1 in a complete, retracted state.

Referring to FIG. 2A, an embodiment of the shell structural system in accordance with the present invention is shown in a complete, retracted state. The lower nested structural sub-frame 129 is attached between the primary, exterior structural frame members 104. The low-geared helical motor and modified worm gear sleeve 132 drives the lower nested structural sub-frame 129 across the lower sub-frame rail guides 109 while the heavy duty solid rubber casters 130 reduces initial friction and contact with surrounding entities during expansion and retraction. As both entities, the low geared helical motor and modified worm gear sleeve 132 and the fixed worm gear screw actuator 131, are interconnected, yet affixed to separate sides of the two-part structural frame and sub-frame system, they can drive the system in either direction by simply reversing the direction of the motor. As the motor rotates the modified worm gear sleeve is forced along the affixed worm gear screw actuator 131 forcing the two sides away or towards one another.

In the retracted state, the structural system may define a first number of core zones, which may comprise a plurality of core zones. In the illustrated embodiment, three separate core zones are defined, namely core zone one 100, core zone three 102, and core zone four 103, as illustrated in FIG. 2A. These core zones may define separate zones for an HVAC system according to the present invention, as described below.

Figure 2B:
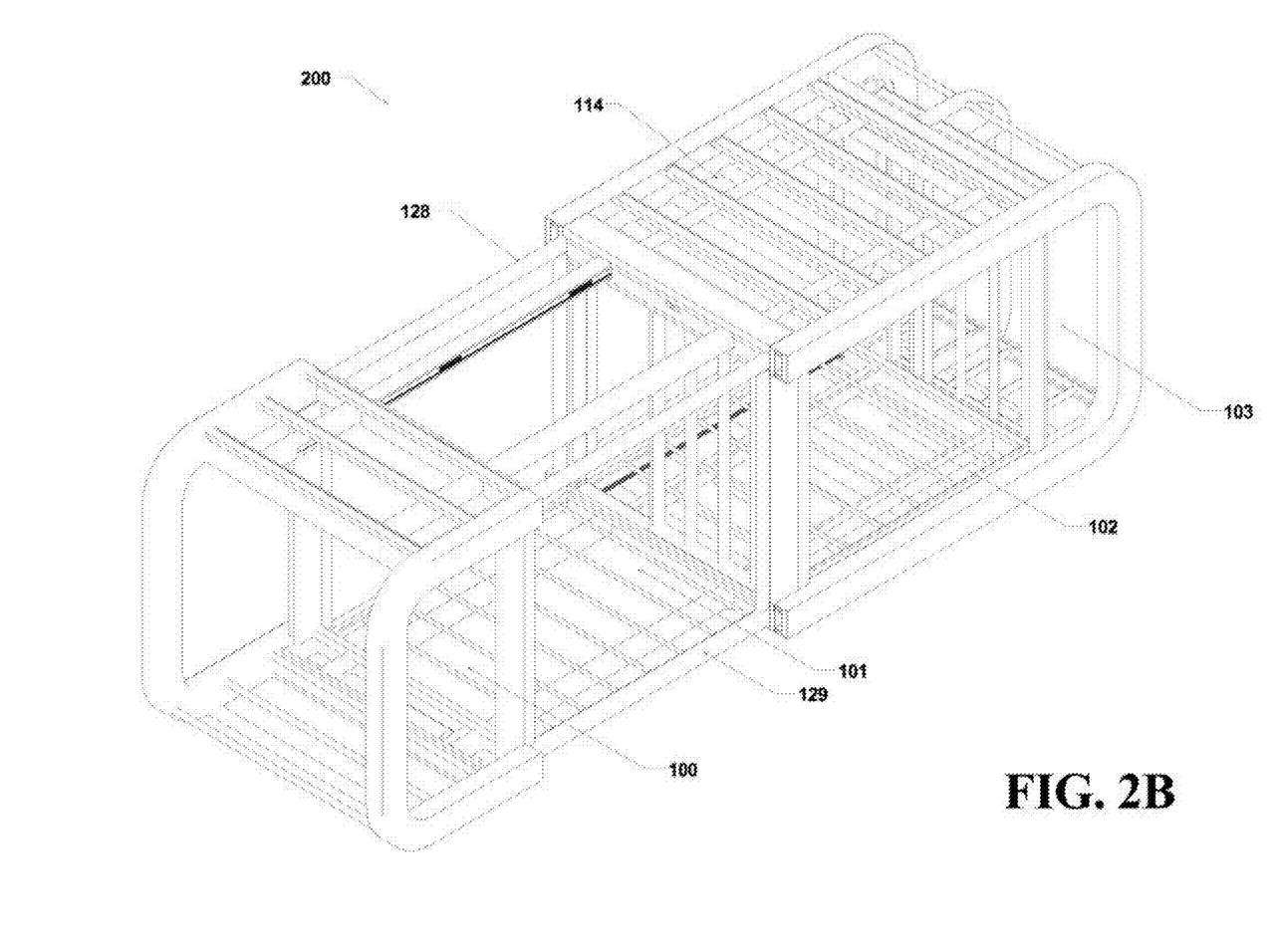
FIG. 2B is a top-down perspective view of the two-part shell structural system of FIG. 1 in a complete, expanded state.

In an expanded state, the structural system may define a second number of core zones, which may be larger than the first number of core zones. Referring to FIG. 2B, an embodiment of the two-part shell structural frame and sub-frame system in accordance with the present invention is shown in the complete, expanded state. In the expanded state, the upper nested structural sub-frame 128 may extend outboard of structural frame plenum 114 and attach HVAC core zone one 100 to core zone three 103, while creating an additional HVAC zone, core zone two 101.

Figure 3A:
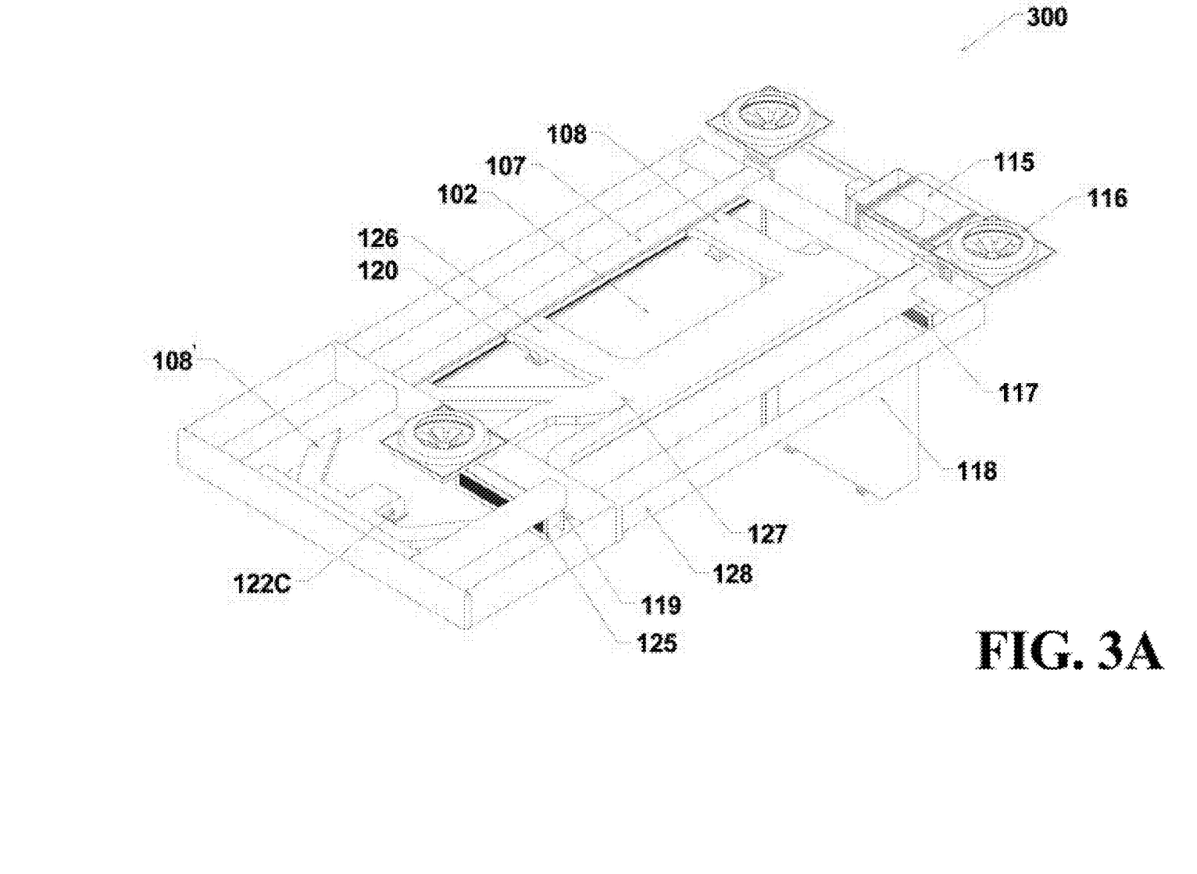
FIG. 3A is a top-down perspective view of an embodiment of an HVAC ductwork system of the present invention in a complete, retracted state.

Referring to FIG. 3A, an embodiment of the integral carbon fiber sub-frame ductwork 107 and accompanying HVAC system 300 in accordance with the present invention is shown in a complete, retracted state. The upper nested structural sub-frame 128 serves dual functionality acting as both the structural guidance, such as in the form of upper sub-frame rail 112 in accompaniment with the upper sub-frame rail guide 110 (see FIG. 1), and serving as an adaptable, integrated sub-frame ductwork 107 system, which may be integral with or defined by upper sub-frame rail 112. In one aspect, the HVAC system may include at least one air conditioner 115 and HVAC ductwork such as proximal ductwork 108, which may connect the air conditioner 115 to the sub-frame ductwork 107, such as via the connection of proximal air supply registers 122a with intermediate air supply registers 122b in sub-frame ductwork 107 (see FIGS. 3A and 3B). In one aspect, the proximal HVAC ductwork 108 may comprise integral carbon fiber ductwork. In this retracted state, the proximal HVAC ductwork 108 may be adapted to supply conditioned air directly to HVAC core zone three 102 (see FIG. 2A). The integral carbon fiber sub-frame ductwork 107 aids in providing air acclimatization/conditioning to multiple core zones in conjunction with the proximal integral carbon fiber ductwork 108 and the accompanying HVAC system.

The accompanying HVAC system 300 takes in fresh, outside air through an inboard ductless heat pump air conditioner inverter condenser 118 and is processed through the air conditioner 115, which may be in the form of an inboard high static chassis air conditioner. As air is conditioned, it is directly dispersed through the proximal HVAC ductwork 108. Air supply registers, such as integrated in-ceiling air supply registers 120, allow for direct air dispersion, while electric parallel blade dampers 126 & 127 can alternatively allow for air diversion or reallocation. The HVAC system 300 may further include distal HVAC ductwork 108', which may be integral carbon fiber ductwork. The distal HVAC ductwork 108' may be in fluid or air communication with proximal HVAC ductwork 108, either directly or indirectly via sub-frame ductwork 107. In the retracted state, the distal HVAC ductwork 108' may be adapted to supply conditioned air to HVAC core zone one 100 (see FIG. 2A), such as via distal supply register 122c.

Through-wall cold air return ducts 119 & 125 allow return air draw through all HVAC core zones. After conditioned, acclimatized air passes through the cold air return 117 where it is processed and introduced back into the accompanying HVAC system. Exhaust fans 116 may be located in HVAC core zone one 100 and core zone four 103, and may displace unconditioned or unwanted air infiltration back to the exterior environment.

Figure 3B:
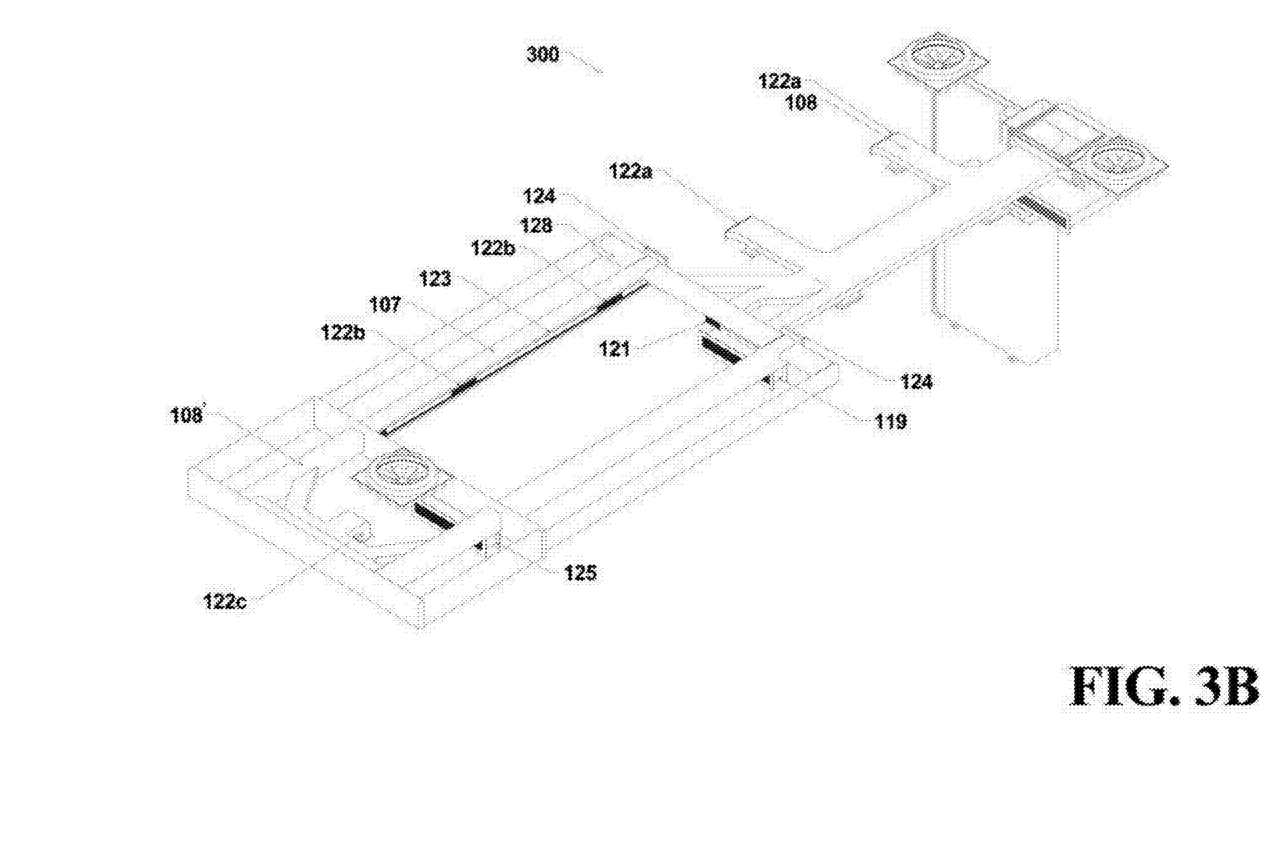
FIG. 3B is a top-down perspective view of the HVAC ductwork system of FIG. 3A in a complete, expanded state.

Referring to FIG. 3B, an embodiment of the integral carbon fiber sub-frame ductwork 107 and accompanying HVAC system in accordance with the present invention is shown in a complete, expanded state. Upon expansion, the proximal HVAC ductwork 108 may provide direct air dispersion for HVAC core zone three 102 (see FIG. 2B), such as through proximal air supply registers 122a. In one aspect, the proximal HVAC ductwork may provide direct air dispersion for HVAC core zone two 101 (see FIG. 2B), such as via through-wall air supply register 121. The proximal HVAC ductwork 108 may also connect the air conditioner 115 to the upper nested structural sub-frame 128 and integral carbon fiber sub-frame ductwork 107 in order to provide direct air dispersion for HVAC core zone two 101 (see FIG. 2B), such as through intermediate supply registers 122b. Because proximal HVAC ductwork 108 is connected to sub-frame ductwork 107, intermediate air supply registers 122b may also be said to be fed from proximal integral carbon fiber ductwork 108. The sub-frame ductwork 107 may connect the proximal HVAC ductwork 108 to the distal HVAC ductwork 108'. In this way, air dispersion for HVAC core zone one 100 may be supplied by distal integral carbon fiber ductwork 108'. Sub-frame ductwork bumpers 124 prevent hyper-extension or retraction, and assure proper ductwork alignment between the proximal air supply registers 122a and intermediate supply registers 122b, in either expanded or retracted state. Air supply registers 122a are internally received by integral sub-frame ductwork guides 123, interlocking the two to minimal resistance and accurate alignment during expansion and retraction.

Figure 4A:
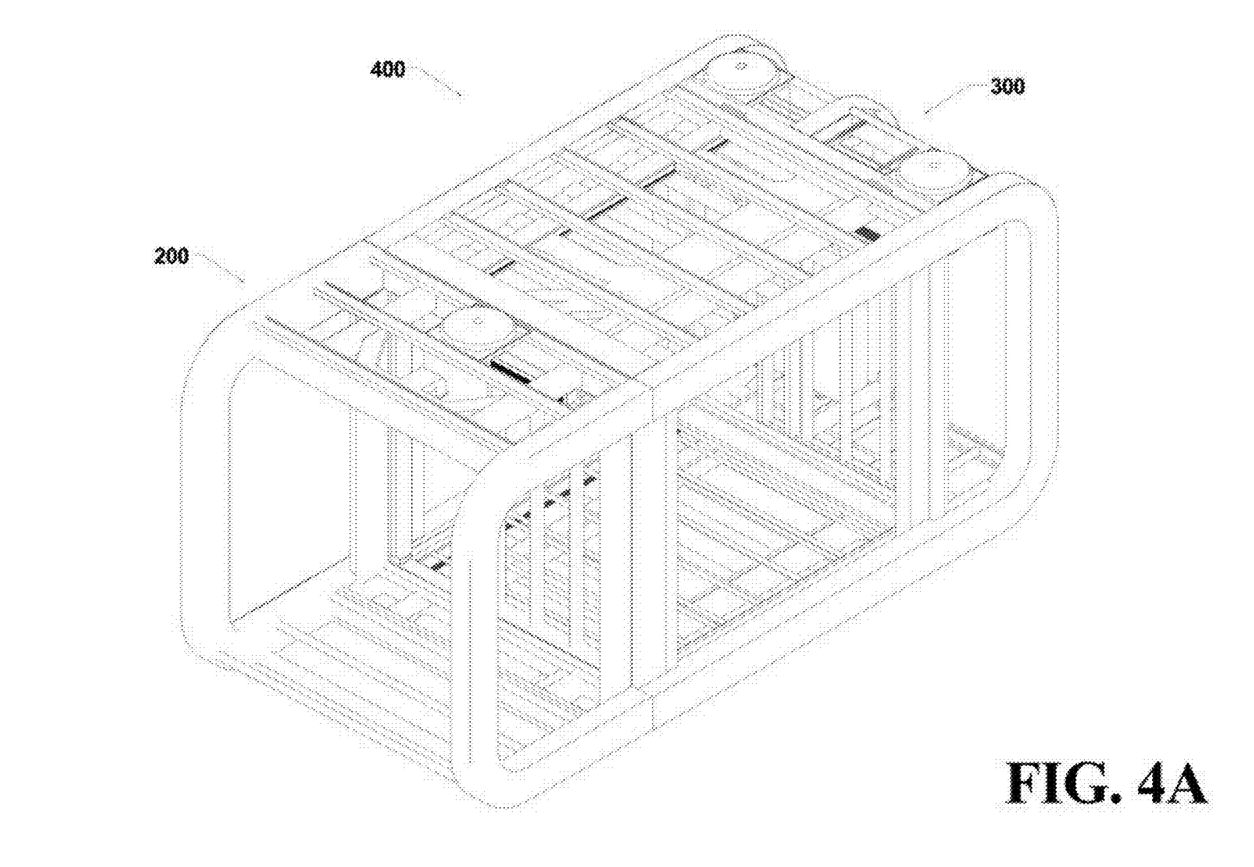
FIG. 4A is a top-down perspective view of an embodiment of the two-part shell structural system of FIG. 2A in combination with the HVAC ductwork system of FIG. 3A.

Referring to FIG. 4A, an embodiment of a complete integrated expandable system 400, including the two-part shell structural system 200 with the integral carbon fiber sub-frame ductwork 107, and the HVAC system 300, in accordance with the present invention is shown in a complete, retracted state.

Figure 4B:
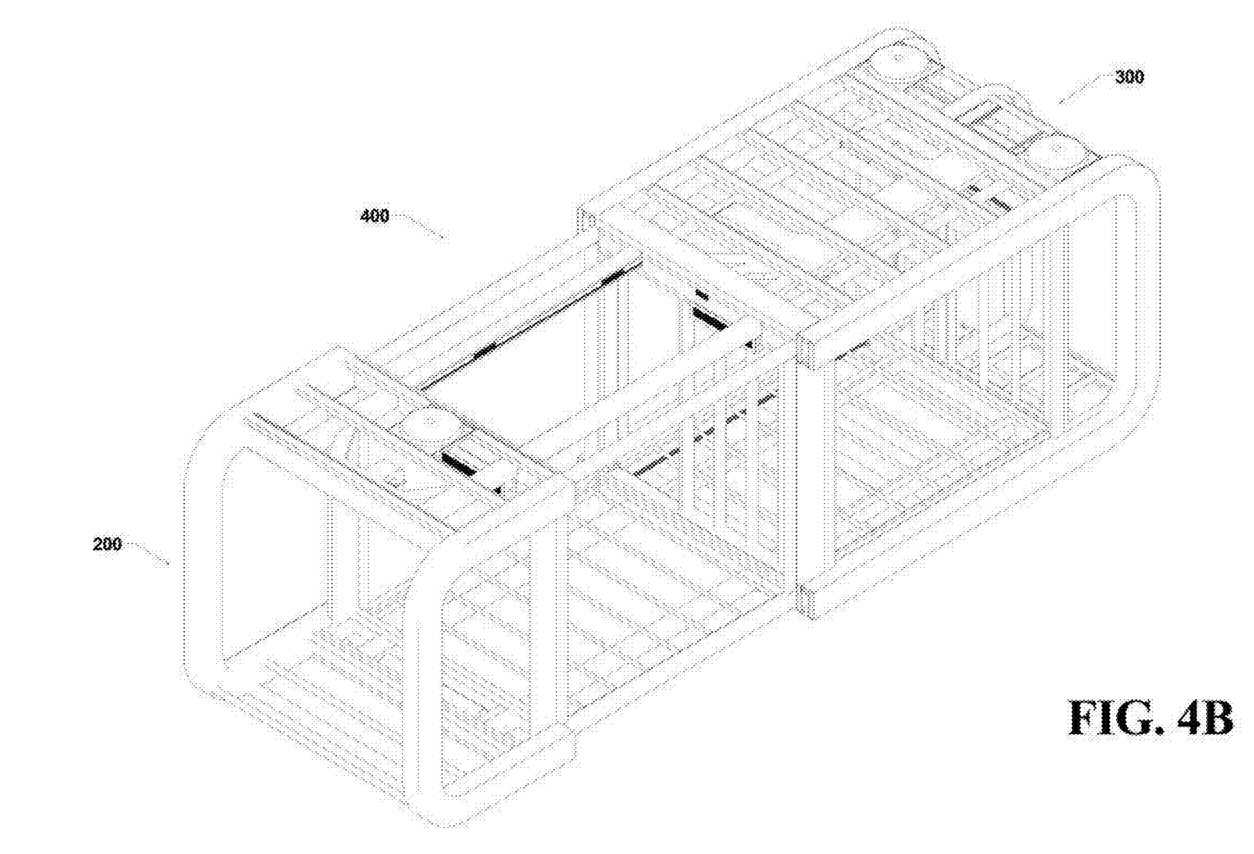
FIG. 4B is a top-down perspective view of an embodiment of the two-part shell structural system of FIG. 2B in combination with the HVAC ductwork system of FIG. 3A.

Referring to FIG. 4B, an embodiment of the complete integrated expandable system 400, including the two-part shell structural system 200 with the integral carbon fiber sub-frame ductwork 107, and the HVAC system 300, in accordance with the present invention is shown in a complete, expanded state.

Figure 5A:
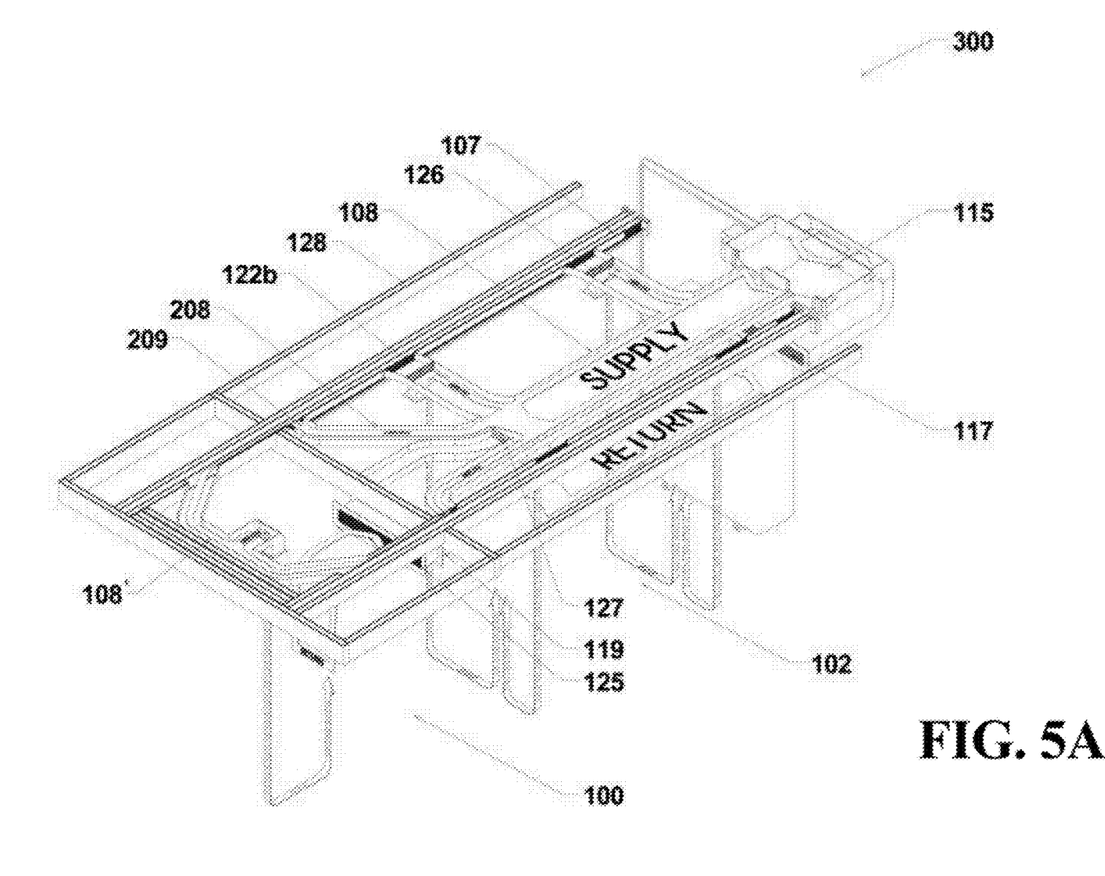
FIG. 5A is a cut away view of the HVAC system of FIG. 3A depicting air-flow patterns of the HVAC ductwork system in a complete, retracted state.

Referring to FIG. 5A, a sectional embodiment of the HVAC system 300, including the integral carbon fiber sub-frame ductwork 107 and accompanying integral carbon fiber ductwork 108 and the typical airflow patterns, in accordance with the present invention is shown in a complete, retracted state. Once processed by the accompanying air conditioner 115, the conditioned air may be dispersed throughout the HVAC core zones by proximal integral carbon fiber ductwork 108, sub-frame ductwork 107, and distal integral carbon fiber ductwork 108'. In the retracted state, HVAC core zone one 100 and core zone three 102 are continually conditioned.

In one embodiment, as illustrated in FIG. 5A, it may be desirable to prevent conditioned air from passing from proximal HVAC ductwork 108, through proximal supply registers 122a and into sub-frame ductwork 107 via intermediate supply registers 122b. In order to prevent inadvertent air diversion from HVAC core zone three 102 through the intermediate air supply register 122b in the carbon fiber sub-frame ductwork 107, electric parallel blade dampers 126 may be provided to prevent or limit conditioned air from passing beyond the in-ceiling air supply register 120 and aid in directing airflow into core zone three 102. Since conditioning to HVAC core zone two 101 is not required in the retracted state (because HVAC core zone two 101 is not present in the retracted state), electric parallel blade damper 127 may also be provided in order to divert the airflow from through-wall air supply register 121 (see FIG. 3B). This configuration may direct conditioned air through diversion ductwork 208 into the integral carbon fiber sub-frame ductwork 107 at a secondary supply aperture 209, where it is forced through the HVAC core zone one 100 via distal integral carbon fiber ductwork 108'. Dashed arrows depict the typical airflow patterns throughout the HVAC core zones.

Once conditioned, air may be drawn back through the HVAC core zones via through-wall cold air return ducts. In the retracted state, HVAC core zone one 100 and core zone three 102 are adjacent, which creates back-to-back congruence of through-wall cold air return ducts 119 and 125, allowing direct return airflow through both HVAC core zones. The air is then returned through the cold air return 117 to the high static chassis air conditioner 115 where it is processed as previously described in FIG. 4B.

Figure 5B:
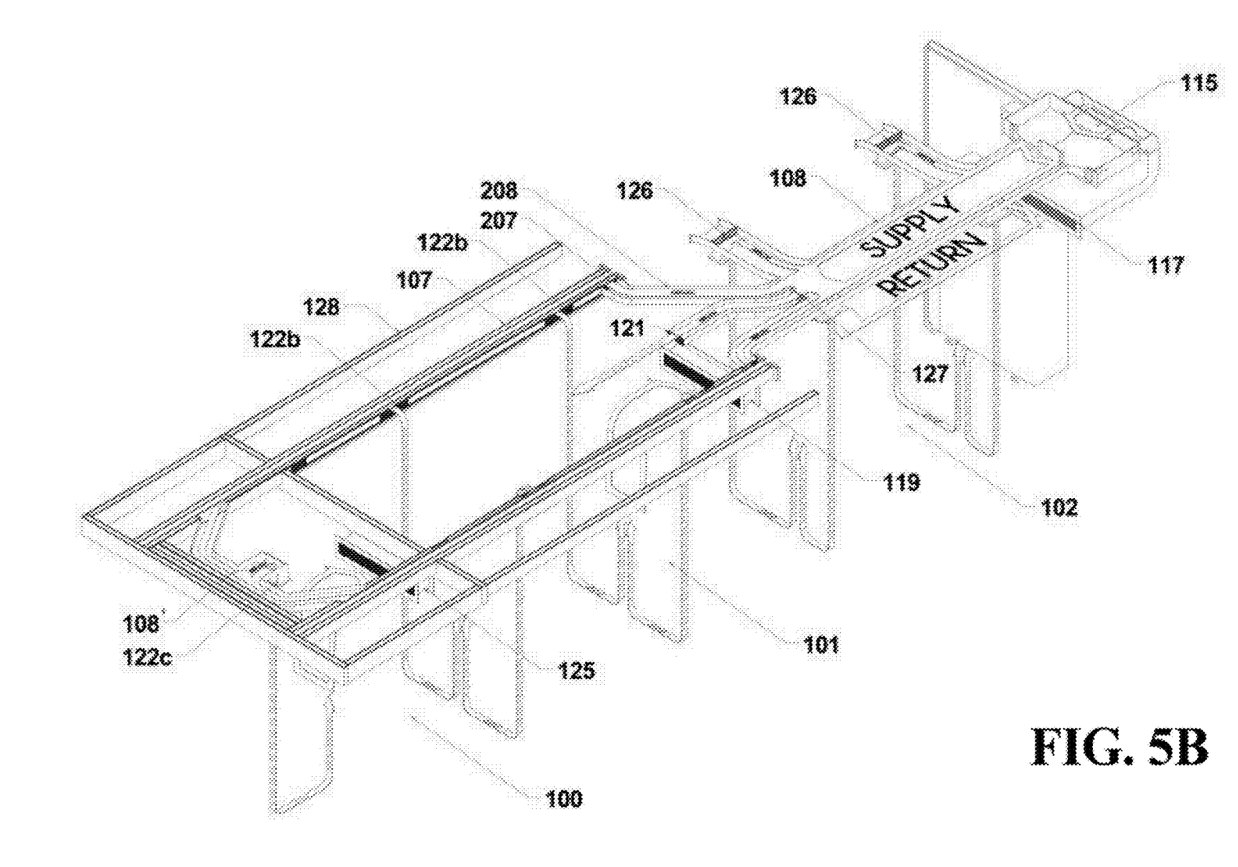
FIG. 5B is a cut away view of the HVAC system of FIG. 3B depicting air-flow patterns of the HVAC ductwork system in a complete, expanded state.

Referring to FIG. 5B, a sectional embodiment of the HVAC system 300, including integral carbon fiber sub-frame ductwork 107 and accompanying integral carbon fiber ductwork 108, and the typical airflow patterns, in accordance with the present invention is shown in a complete, expanded state. Once expanded, all HVAC core zones (100, 101, 102) can be conditioned.

In order to prevent inadvertent air diversion from HVAC core zone three 102 into the surrounding structural sub-frame plenum (114 in FIG. 1A), electric parallel blade dampers 126 may prevent or limit conditioned air from passing beyond the in-ceiling air supply register (120 in FIG. 3A) and aid in directing airflow into core zone three 102 through said in-ceiling air supply registers 120.

Since conditioning to HVAC core zone two 101 is required in the expanded state, electric parallel blade damper 127 may be opened to allow the airflow from through-wall air supply register 121, directly into core zone two 101. In another aspect, conditioned air may flow through the diversion ductwork 208 of proximal HVAC ductwork 108 and into the sub-frame ductwork 107 in order to flow into HVAC core zone two 101. For example, diversion ductwork 208 may align with a primary supply aperture 207 in sub-frame ductwork 107 in the expanded state, thereby allowing conditioned air to flow therethrough. The conditioned air may then enter HVAC core zone two 101 via intermediate air supply registers 122b in the sub-frame ductwork 107.

In order to condition the air of HVAC core zone one 100, the conditioned air may continue to flow through sub-frame ductwork 107 into distal HVAC ductwork 108'. From there, the conditioned air may enter HVAC core zone one 100 via distal air supply register 122c.

Dashed arrows depict the typical airflow patterns throughout the three primary HVAC core zones. Once acclimatized, air is then returned as on open air return system via through-wall cold air returns (119,125,117) to the high static chassis air conditioner 115 where it is processed as previously described in FIG. 4B.

Figure 6:
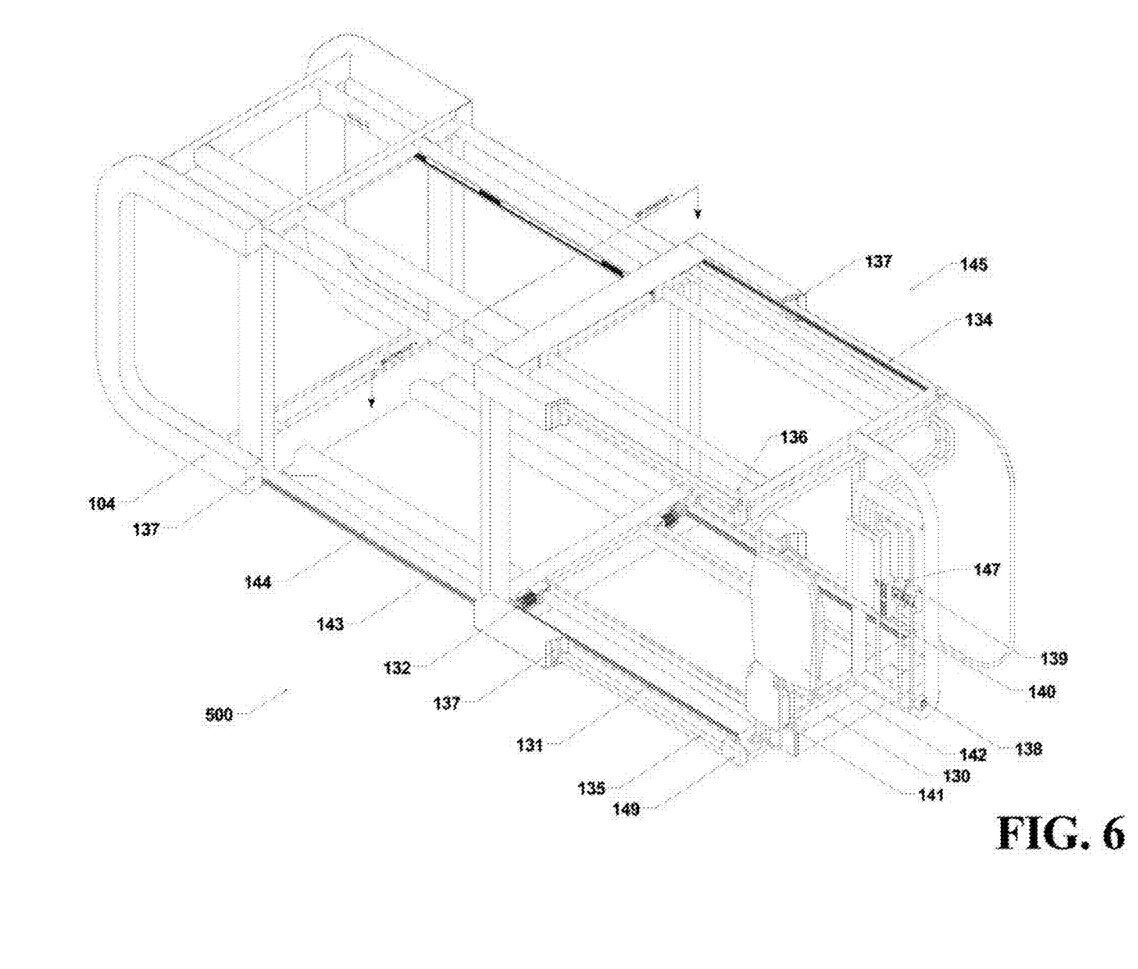
FIG. 6 is a cut away view of the two-part shell structural system of FIG. 2B including an expansion drive mechanism and integral frame power system in a complete, expanded state.

Referring to FIG. 6, a cutaway embodiment of an expansion drive mechanism 500 and integral frame power system 145 within the two-part shell structural frame and sub-frame system, in accordance with the present invention, is shown in a complete, expanded state. The expansion drive mechanism works in conjunction with the frame power system to both actively expand and retract the frame, and integrally provide a means of power conversion between on-grid and off-grid power resources in order to maximize power utilization and ensure safety during all facets of utilization. The term "on-grid" is meant to reflect the use of a power supply external to the overall structure, such as from a public utility or other infrastructure such as a public electrical grid. The term "off-grid" is meant to reflect the use of a self-sustaining power supply associated with the structure itself, such as solar panels, wind turbines, hydroelectric turbines, battery power, or fuel cell power.

The integral frame power system 145 provides both on-grid and off-grid power supply options and is the primary power source for the expansion drive mechanism. During off-grid utilization, as solar energy is received from the exterior photovoltaic collection cells (not shown in FIG. 6 for clarity purposes), it is transferred from the photovoltaic power collection point 136 and is transferred by electrical conduit to the photovoltaic storage and power back-up system 142. Once collected the power is sent through the photovoltaic power inverter 141 where it is converted to direct current power. Upon conversion, the newly inverted power is sent to a bi-directional photovoltaic meter. Once the bi-directional photovoltaic meter 139 has processed the power supply, an on-board CPU will intelligently disperse power as needed through the on-board electric panel 140, where it is then dispersed to the two integral, insulated upper conduction sleeves 134 through the integral conduction sleeve plenum 137 within the primary exterior structural frame member 104. Therefore, in the off-grid configuration, power may be supplied at least partially through the exterior structural frame member 104, such as through insulated conduction sleeves 134,135 or conduction sleeve plenum 137, to the various electrical components of the expandable structure of the present invention.

During on-grid power utilization, the integral, insulated upper conduction sleeves 134 are interconnected by conduit which may be channeled through the integral conduction sleeve plenum 137 within the four primary exterior structural frame members 104. In the expanded state, power is transferred from the integral insulated upper conduction sleeve 134 through the structural sub-frame conduction transfer plenum 144 within the upper nested structural sub-frame 128. Accordingly, in the on-grid configuration, power may be supplied through both the exterior structural frame member 104, such as through insulated conduction sleeves 134,135 or conduction sleeve plenum 137, and through the structural sub-frame 128,129, such as through sub-frame conduction transfer plenum 144, to the various electrical components of the expandable structure of the present invention.

Figure 7A:
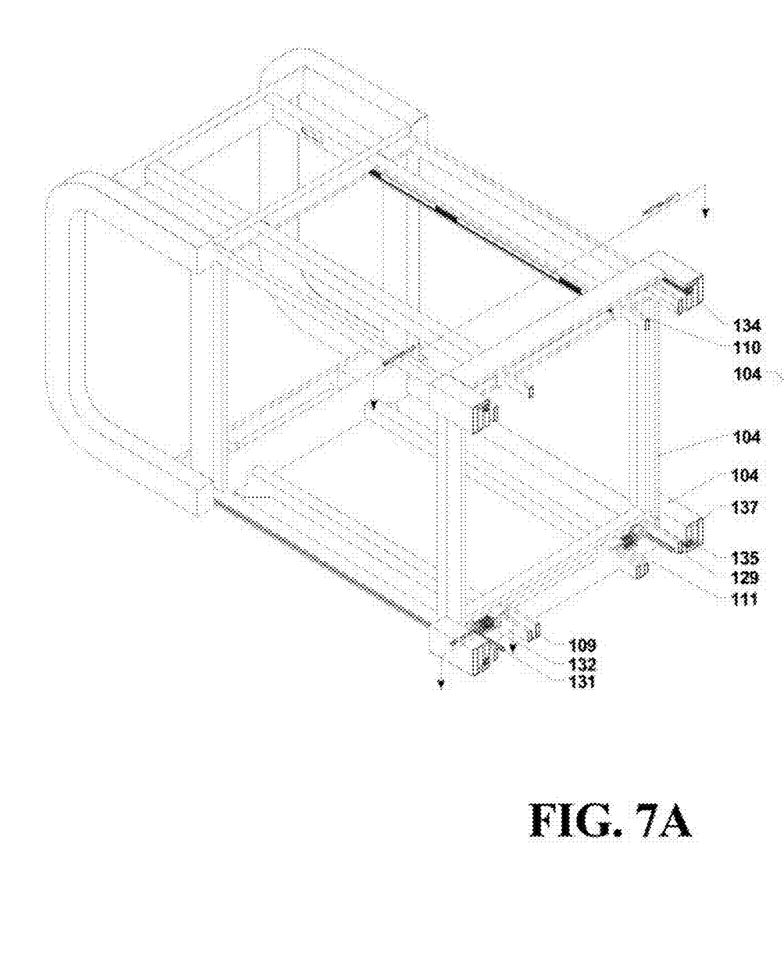
FIG. 7A is a perspective sectional view of the structural system including the drive mechanism and integral frame power system of FIG. 6 cut along plane 7-7.
Figure 7B:
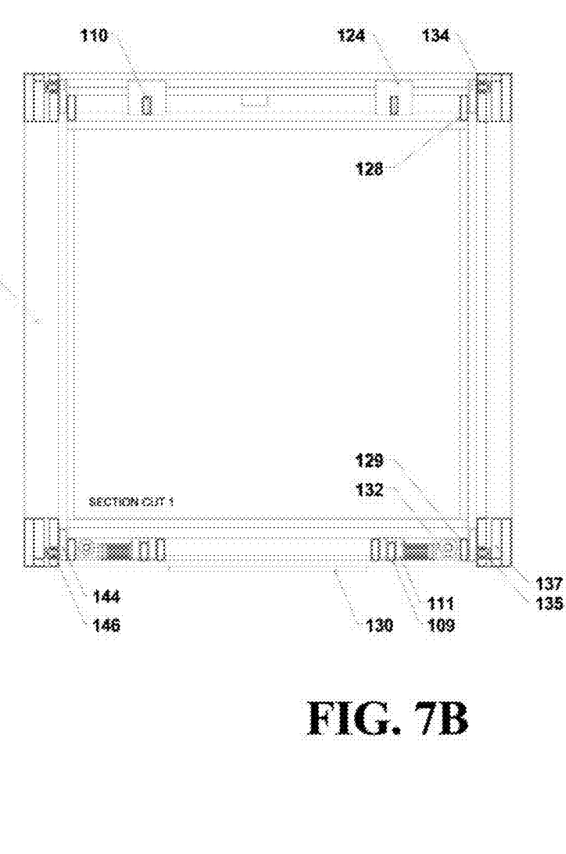
FIG. 7B is a cross sectional view of the structural system including the drive mechanism and integral frame power system of FIG. 6 cut along plane 7-7.
Figure 7C:
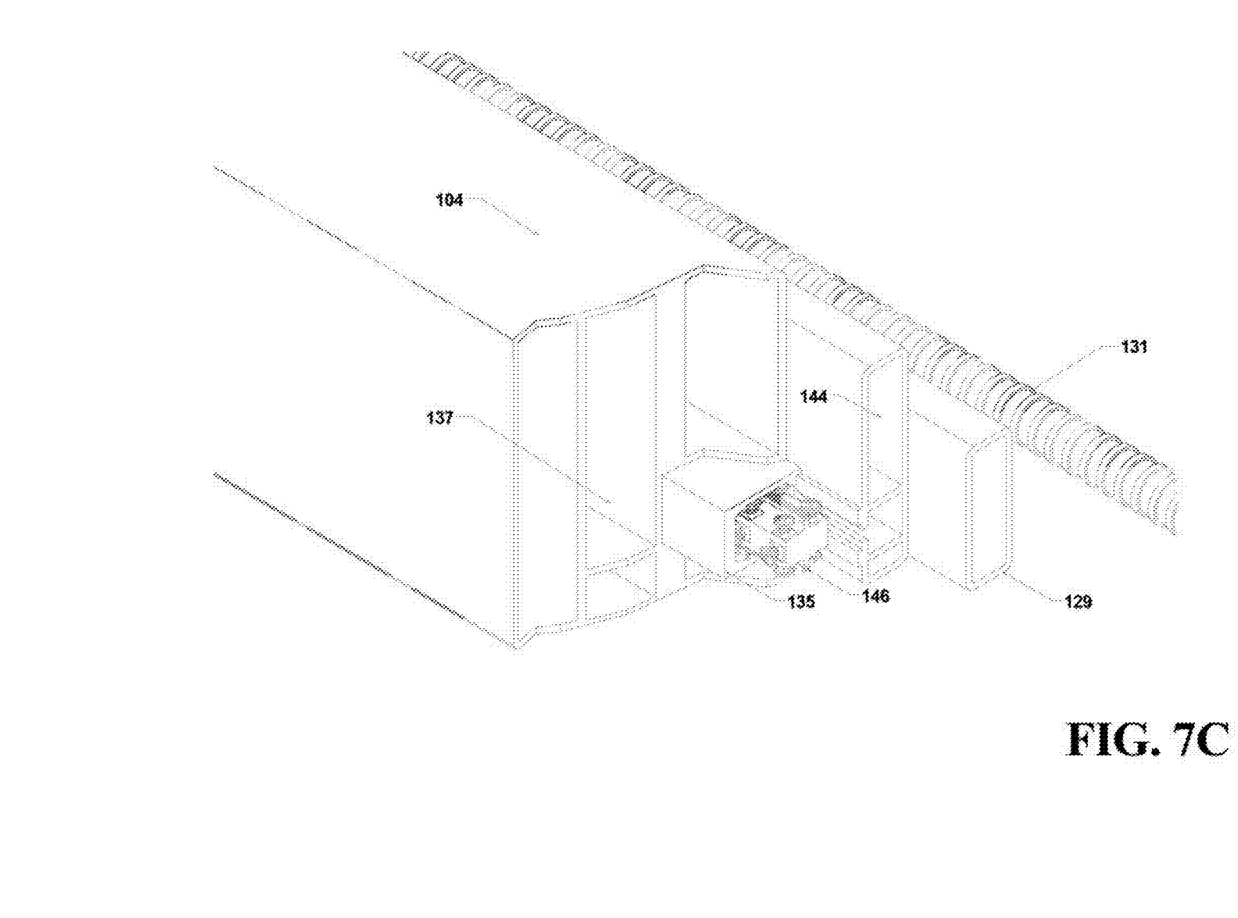
FIG. 7C is a perspective sectional view of the drive mechanism and integral frame power system.

Power may be delivered from the upper and lower integral, insulated conduction sleeves (134,135) to the structural sub-frame conduction transfer plenum 144 by an insulated caster carriage dongle 146, which may be internally affixed to the lower nested structural sub-frame 129, as shown in FIG. 7C. The insulated caster carriage dongle 146 may be adapted to travel within a track of conduction sleeve 135. In one aspect, the insulated caster carriage dongle 146 may include one or more rollers adapted for assisting in the translation of the dongle with respect to the conduction sleeve 135, and for maintaining electrical contact with the conduction sleeve 135. As lower nested structural sub-frame 129, in conjunction with the fixed worm gear screw actuator 131 and reversible low-geared helical motor and modified worm gear sleeve 132, is forced along the lower sub-frame rail guide 109, the affixed, insulated caster carriage dongle 146 maintains a constant, closed circuit power connection by rolling along the inside of the electrified integral insulated conduction sleeve 135. This method of power transfer not only allows electrification of both sides of the two-part shell structural frame and sub-frame system but also allows a means of 360 degree electrification of all stationary interior spaces with the introduction of operable, intermediate insulated caster carriage dongles 146.

Switching between on-grid and off-grid utilization is accomplished by moving the insulated caster carriage dongle 146 to close a circuit position, thereby powering a respective on-grid circuit or off-grid circuit as described above. During expansion and retraction of the structural system 200, the interconnected structural sub-frame conduction transfer plenum 144 and the affixed, insulated caster carriage dongle 146 are in contact with the insulated lower conductive sleeve 135 as they are forced along the lower sub-frame rail guide 109 back towards the initial expansion start point. While the dongle 146 is in contact with the insulated lower conductive sleeve 135, as illustrated in FIG. 7C, the on-grid circuit is closed, thereby allowing on-grid power utilization. At a fully retracted position, an end of conduction transfer plenum 144, to which the dongle 146 is attached, is adapted to extend beyond an end of the conductive sleeve 135. This fully retracted state of the structural system 200 causes the dongle 146 to lose contact with the conductive sleeve 135, thereby opening the on-grid circuit.

As can be seen in FIG. 6, an integral frame power transfer box 149 may be present at an end of the structural system 200 and adapted to receive the insulated caster carriage dongle 146 upon full retraction. As the caster carriage dongle 146 enters the integral frame power transfer box 149, the dongle 146, which has passed the end of the conductive sleeve 135, thereby opening the on-grid circuit, is allowed to contact a transfer hub within the integral frame power transfer box 149. Contact between the dongle 146 and the transfer hub within transfer box 149 closes the off-grid circuit, thereby allowing the onboard power distribution system to switch to an off-grid mode.

The expansion of the structural system 200 may result in the reverse switch from off-grid utilization to on-grid utilization. Specifically, as the structural system 200 expands, the dongle 146 may withdraw from the integral frame power transfer box 149, thereby breaking contact with the transfer hub of the power transfer box 149. Be breaking this contact, the off-grid circuit may be opened. Upon further expansion of the structural system 200, the dongle 146 may make contact with the conductive sleeve 135, thereby closing the on-grid circuit.

In one aspect, the power transfer box 149 may be electrically insulated, so as to prevent any open spark or short circuit during power transfer between the on-grid circuit and the off-grid circuit. For example, the power transfer box 149 may be in the form of an electrical junction box.

During the off-grid mode, the photovoltaic storage and power back-up system 142 may re-route power through an alternate bi-directional photovoltaic meter 147. The alternate bi-directional photovoltaic meter 147 then communicates with the on-board CPU, re-routing power to only those circuits that require power in the retracted state. The carriage dongle's transfer of contact from the conductive sleeve 135 to the integral frame power transfer box 149 allows a simple, closed circuit/open-circuit transference of power while providing maximum versatility and optimal safety during the complete, retracted state.

While the disclosure presents certain embodiments to illustrate the inventive concepts, numerous modifications, alterations, and changes to the described embodiments are possible without departing from the sphere and scope of the present invention, as defined herein. For example, the number of core zones in the retracted condition and in the expanded condition may be greater than or less than is illustrated in the accompanying figures. The electrical switching device illustrated as a rolling member, namely a caster carriage dongle, in the present disclosure may take the form of a sliding member or any other configuration capable of maintaining electrical contact between the respective telescoping structural members in one configuration, and breaking said electrical contact between the structural members in another configuration. Accordingly, it is intended that the present disclosure not be limited to the described embodiments, but that it has the full scope defined by the language of the following claims, equivalents thereof, and that which is in the purview of the ordinarily skilled artisan upon examination of the disclosure.

The invention claimed is:

1. A structure comprising:
   an expandable structural frame adapted to expand to an expanded condition and retract to a retracted condition, wherein the expandable structural frame comprises a first frame member and a second frame member, said first and second frame members telescopically connected to one another for expansion and retraction of the structure;
   a first electrical flow path adapted for providing electrical power to the structure in the expanded condition;

a second electrical flow path adapted for providing electrical power to the structure in the retracted condition, said second electrical flow path different from the first electrical flow path;

an electrically conductive switching device, said electrically conductive switching device comprising a caster carriage dongle, in a fixed position with respect to the first frame member and adapted to maintain moving contact with the second frame member during expansion and retraction of the structure; and an expandable HVAC system including primary ductwork, secondary ductwork, and tertiary ductwork, wherein the primary ductwork, secondary ductwork, and tertiary ductwork are adapted to together define an expanded configuration and a retracted configuration;

wherein the expandable HVAC system defines a first fluid pathway in the expanded configuration and a second fluid pathway in the retracted conditions, said second fluid pathway being different from the first fluid pathway.

2. The structure of claim 1, wherein the second frame member includes a track for receiving the caster carriage dongle.

3. The structure of claim 1, wherein the caster carriage dongle includes at least one roller adapted for rolling along the second frame member during expansion and retraction of the structure.

4. The structure of claim 1, wherein electrical contact between the caster carriage dongle and the second frame member closes a first circuit, thereby allowing electricity to flow along the first electrical flow path.

5. The structure of claim 4, wherein in the retracted condition, the caster carriage dongle is not in electrical contact with the second frame member, thereby opening the first circuit.

6. The structure of claim 5, wherein the expandable structural frame further includes a power transfer box adapted to contact the caster carriage dongle in the retracted condition, thereby closing a second circuit and thereby allowing electricity to flow along the second electrical flow path.

7. The structure of claim 1, wherein the first electrical flow path is adapted to utilize power from an on-grid power source, and wherein the second electrical flow path is adapted to utilize power from an off-grid power source.

8. The structure of claim 1, further including means for expanding the expandable structural frame between the retracted and expanded conditions.

9. The structure of claim 1, wherein the primary ductwork, the secondary ductwork, and the tertiary ductwork are in direct serial fluid communication with one another in both the expanded configuration and in the retracted configuration.

10. The structure of claim 1, wherein in the expanded condition, the expandable structural frame defines a first zone, a second zone, and a third zone, and wherein in the retracted condition, the expandable structural frame defines only the first zone and the third zone.

11. The structure of claim 10, wherein in the expanded condition, the primary ductwork is in direct fluid communication with the first zone, the secondary ductwork is in direct fluid communication with the second zone, and the tertiary ductwork is in direct fluid communication with the third zone; and wherein in the retracted condition, the secondary ductwork is not in direct fluid communication with the first, second, or third zones.

12. The structure of claim 10, wherein the first fluid pathway is adapted to deliver conditioned air through the primary ductwork, the secondary ductwork, and the tertiary ductwork to the first zone, the second zone, and the third zone; and wherein the second fluid pathway is adapted to deliver conditioned air through the primary ductwork, the secondary ductwork, and the tertiary ductwork to the first zone and the third zone only.

13. The structure of claim 12, wherein the secondary ductwork includes at least one register, said register adapted to receive conditioned air from the primary ductwork in the retracted condition and said register further adapted to deliver conditioned air to the second zone in the expanded condition.

* * * * *